United States Patent [19]

Franaszek et al.

[11] Patent Number: 5,193,188

[45] Date of Patent: Mar. 9, 1993

[54] CENTRALIZED AND DISTRIBUTED WAIT DEPTH LIMITED CONCURRENCY CONTROL METHODS AND APPARATUS

[75] Inventors: Peter A. Franaszek, Katonah; John T. Robinson, Yorktown Heights; Alexander Thomasian, Pleasantville, all of N.Y.

[73] Assignee: International Business Machines Corporation, Armonk, N.Y.

[21] Appl. No.: 660,762

[22] Filed: Feb. 25, 1991

Related U.S. Application Data

[63] Continuation-in-part of Ser. No. 294,334, Jan. 5, 1989, abandoned.

[51] Int. Cl.$^5$ .............................................. G06F 15/40
[52] U.S. Cl. ........................... 395/650; 364/DIG. 1; 364/281.4; 364/282.1
[58] Field of Search ............... 364/DIG. 1; 395/650; 340/825.5

[56] References Cited

U.S. PATENT DOCUMENTS

| | | | |
|---|---|---|---|
| 4,224,664 | 9/1980 | Trinchieri | 364/DIG. 1 |
| 4,316,245 | 2/1982 | Luu et al. | 364/DIG. 1 |
| 4,318,182 | 3/1982 | Bachman et al. | 364/DIG. 1 |
| 4,574,350 | 3/1986 | Starr | 364/DIG. 1 |
| 4,791,554 | 12/1988 | Hirota et al. | 364/DIG. 1 |
| 4,814,979 | 3/1989 | Neches | 364/DIG. 1 |
| 4,853,843 | 8/1989 | Ecklund | 364/DIG. 1 |

OTHER PUBLICATIONS

Date, "An Introduction to Database Systems vol. II", Addison-Wesley Publishing Co., 1983, pp. 83-100.
Lorin et al., "Operating Systems", Addison-Wesley Publishing Co., 1984, pp. 91-92.
"Encyclopedia of Computer Science and Engineering", Ralston et al.-Editors, Van Nostrand Reinhold Co., pp. 1532-1535.

*Primary Examiner*—Thomas M. Heckler
*Attorney, Agent, or Firm*—Whitham & Marhoefer

[57] ABSTRACT

A wait depth limited concurrency control method for use in a multi-user data processing environment restricts the depth of the waiting tree to a predetermined depth, taking into account the progress made by transactions in conflict resolution. In the preferred embodiment for a centralized transaction processing system, the waiting depth is limited to one. Transaction specific information represented by a real-valued function L, where for each transaction T in the system at any instant in time L(T) provides a measure of the current "length" of the transaction, is used to determine which transaction is to be restarted in case of a conflict between transactions resulting in a wait depth exceeding the predetermined depth. L(T) may be the number of locks currently held by a transaction T, the maximum of the number of locks held by any incarnation of transaction T, including the current one, or the sum of the number of locks held by each incarnation of transaction T up to the current one. In a distributed transaction processing system, L(T) is based on time wherein each global transaction is assigned a starting time, and this starting time is included in the startup message for each subtransaction, so that the starting time of global transaction is locally known at any node executing one of its subtransactions.

22 Claims, 8 Drawing Sheets

INITIAL STATE

CASE I: IF m > 0 THEN
RESTART T' UNLESS
$L(T') \geq L(T)$ AND
FOR $i=1,2,\ldots,m$
$L(T') \geq L(Ti'')$
IN WHICH CASE
RESTART T CASE II (m = 0):
RESTART T1 UNLESS
$L(T1) \geq L(T)$ AND
$L(T1) \geq L(T')$
IN WHICH CASE
RESTART T CASE III (m > 0):
RESTART T' UNLESS
$L(T') \geq L(T1)$ AND
FOR $i=1,2,\ldots,m$
$L(T') \geq L(Ti'')$
IN WHICH CASE
RESTART T1

CENTRALIZED AND DISTRIBUTED WAIT DEPTH LIMITED CONCURRENCY CONTROL METHODS AND APPARATUS

CROSS-REFERENCE TO RELATED APPLICATION

This application is a continuation-in-part application of application Ser. No. 07/294,334 filed Jan. 5, 1989, by the applicants of this application and entitled "Wait Depth Limited Concurrency Control Method" abandoned.

DESCRIPTION

BACKGROUND OF THE INVENTION

1. Field of the Invention

This invention generally relates to concurrency control in a multi-user data processing environment and, more particularly, to a new concurrency control (CC) method which restricts the wait depth of waiting transactions to a predetermined depth and takes into account the progress made by transactions in conflict resolution. In a preferred embodiment of the invention as applied to a centralized environment, the wait depth may be limited to one. The invention is generalized to a distributed environment by adopting a time based wait function.

2. Description of the Prior Art

In a multi user data processing environment, some sort of concurrency control is needed in order to avoid problems when two or more users attempt to update a field of a record in the database on the basis of an initial value of that field. One approach to concurrency control is known as locking. Another is known as timestamping or optimistic concurrency control. Of the two, locking is the more important as it is the method that is predominantly used.

A transaction can obtain a lock on a record by issuing a request to a system component called the lock manager. If a transaction holds an exclusive lock on some object, say, a database record, then no other transaction can acquire a lock of any type on that object until the first transaction releases its lock. Any transaction that intends to update a record must first acquire a lock on it. If a lock cannot be acquired, the transaction is blocked and goes into a wait state. The transaction is restarted when the record becomes available and the lock can be granted. While this locking protocol solves the lost update problem, it introduces two others. One is the problem of deadlock, in which two or more transactions are in a simultaneous wait state, each waiting for the others to release a lock required for it to proceed. The other problem, which can be encountered in high performance applications (where typically a substantial number of transactions are being processed concurrently) is that many or even most of these transactions can be waiting at a given time, even without the presence of deadlock. Increasing the level of concurrency (the number of transactions attempting to proceed simultaneously) can actually reduce the number doing useful work (i.e., not waiting or in deadlock) at a given time.

The problem of deadlock has been extensively studied. In general, the lock manager must be capable of detecting the occurrence of deadlocks and resolve them. Resolving the deadlock amounts to choosing one of the locked transactions and rolling it back. This process involves terminating the transaction and undoing all its updates and releasing its locks so that the resources concerned can be allocated to other transactions.

The general problems associated with concurrency in database transactions is considered in more detail by C. J. Date at Chapter 3, "Concurrency", An Introduction to Database Systems, Vol. II, Addison-Wesley Publishing Company (1983). The reader is referred to that text for more information on the various concurrency problems and protocols used, especially in the locking type concurrency controls.

A running priority (RP) concurrency control (CC) is described in an article entitled "Limitations of Concurrency in Transaction Processing" by P. A. Franaszek and J. T. Robinson, published in ACM Transactions on Database Systems 10, March 1985, pp. 1 to 28. This method results in improved performance compared to standard locking because it approximates "essential blocking" by having no transaction blocked (i.e., waiting for a lock) held by another blocked transaction.

A problem with the RP method, as well as others including optimistic CC, is the quadratic effect; i.e., "long" transactions accessing a large number of data items are affected adversely by lock contention in a "quadratic" manner. More specifically, the more locks a transaction holds, the more susceptible it is to lock conflicts, and the time spent by the transaction in the system increases proportionally to the number of locks held, making the transaction more susceptible to lock conflicts and restarts.

The problem of concurrency control in the general case of a distributed transaction processing system becomes even greater due to the increasing disparity between processor speeds and data access latencies and the large number of processors typical of such systems. In distributed systems, each transaction executes as a number of communicating subtransactions running concurrently at different nodes in the system. Each subtransaction accesses data items stored at the node at which it runs. An overview of such systems and known distributed concurrency control methods can be found, for example, in Chapter 12 of Korth and Silberschatz, Database System Concepts, McGraw-Hill (1986).

The most commonly used approach to distributed concurrency control is to use the standard centralized locking method at each node for all subtransactions running at that node. Each subtransaction of a given transaction holds all locks it acquires until all subtransactions signal completion, after which a commit protocol is followed for recovery purposes. All locks are then released by each subtransaction as part of the completion of the commit protocol. Distributed deadlock detection is a known problem under this approach, and a variety of techniques are known to deal with it. A more serious problem is that the level of data contention is likely to be significantly higher than that of a centralized system with similar total processing power and with a similar transaction processing workload, for the following reasons. First, compared to the centralized system, there are additional delays for each transaction due to communication among subtransactions during execution and during the commit phase, resulting in increased lock holding times. Second, the total number of processors in the distributed system could be significantly larger than in the centralized case, thus requiring a higher total level of concurrency just to utilize the processors.

The trend towards longer and more complex transactions supported by distributed systems substantially increases the amount of data contention, which could limit the total available throughput. It is known that the usual locking methods of concurrency control are not well suited to environments where data contention is a significant factor.

SUMMARY OF THE INVENTION

It is therefore an object of the present invention to provide a new concurrency control method that reduces unnecessary lock conflicts.

It is another object of the invention to provide a concurrency control which appropriately restricts the depth of the waiting tree, as in the RP method, and in addition takes into account the progress made by transactions in conflict resolution.

It is a further object of the invention to provide a distributed concurrency control that avoids the throughput limitation and deadlock detection problems of known locking methods under conditions of high data contention.

It is yet another object of the invention to provide weight depth limited concurrency control for distributed transaction processing systems which avoids the problems of excessive transaction restarts that occur using other known techniques.

According to the invention, instead of restarting transactions immediately, transaction restart is delayed until all conflicting transactions, at the point in time the conflict occurred, are completed or restarted. The wait depth limited (WDL) concurrency control (CC) of a preferred embodiment of this invention, while restricting the depth of the waiting tree to one as in the RP method so that no blocked transaction can block another, has the following additional advantages: First, it mitigates the problem that long transactions have disproportionally long response times by taking into account the number of data items accessed and locks obtained by transactions. Second, restarted transactions release their locks, but their restart is delayed until the conflicting transactions are completed or themselves restarted. This results in reduced wasted CPU processing, since such restarted transactions may be conflicted and restarted again by the original transactions. Third, as compared to the RP methods, the WDL method of this invention is symmetrical in that an active transaction which encounters a lock conflict (with an active transaction) and is to be blocked, is itself considered for restart if it is blocking some other transactions. This assures that no transaction is ever blocked by another blocked transaction.

In the preferred embodiment as applied to a centralized system, the WDL method according to the invention defines the length of a transaction as the number of locks held by the transaction. This approach has been shown to yield good performance. However, in the distributed case, given a particular subtransaction, determination of the total number of locks held by a all subtransactions of the global transaction would involve excessive communication, and in any case the information could be obsolete by the time it was finally collected. Therefore, for distributed WDL, a length function based on time is preferred. Each global transaction is assigned a starting time, and this starting time is included in the startup message for each subtransaction, so that the starting time of a global transaction will be locally known at any node executing one of its subtransactions. Given a transaction, its length is defined as (current time)−(starting time of global transaction).

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE PREFERRED EMBODIMENTS OF THE INVENTION

Figure 1:
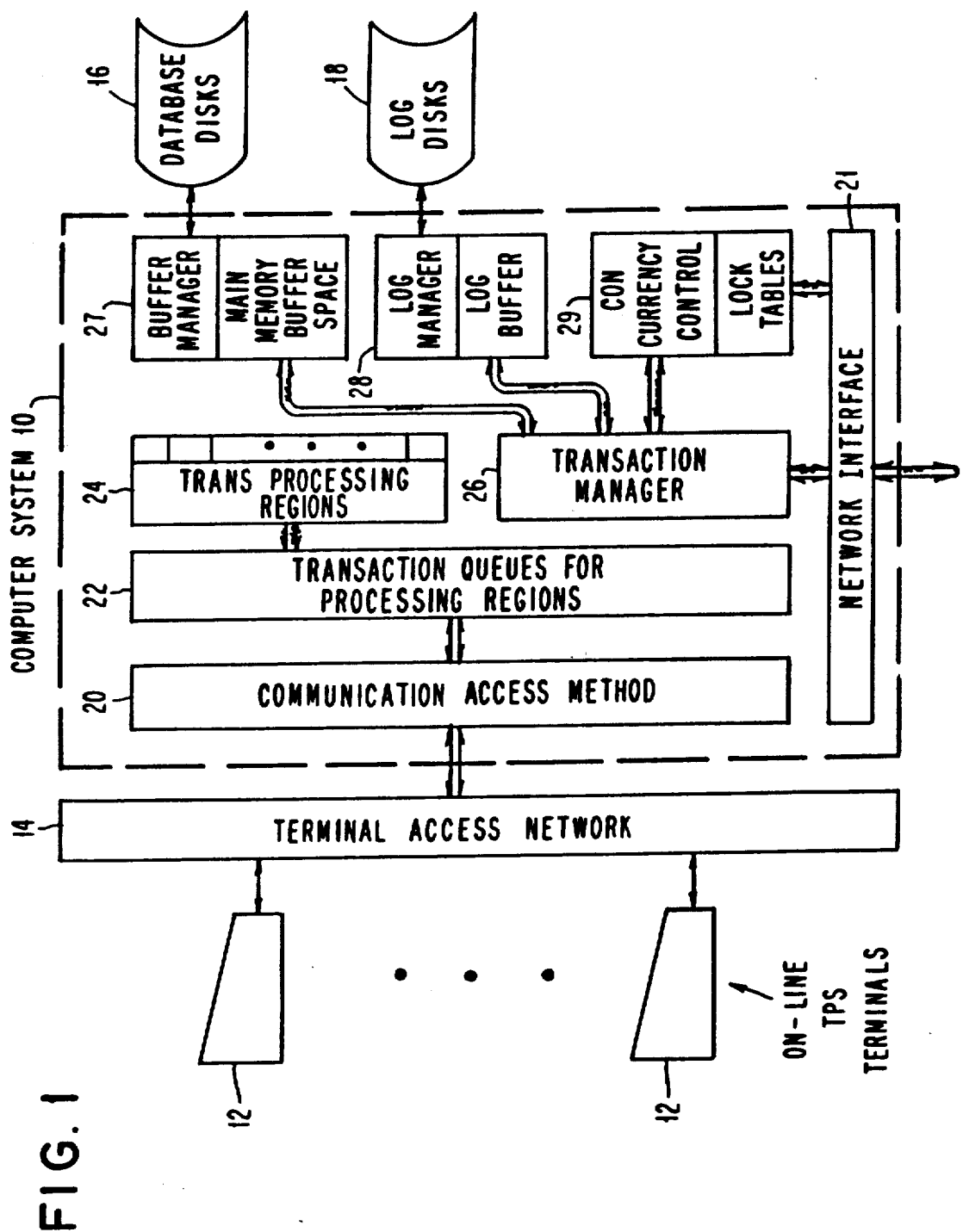
FIG. 1 is a block diagram of a typical multi user centralized computer system on which one embodiment of the invention may be implemented.

Referring now to the drawings, and more particularly to FIG. 1, there is shown a typical multi-user centralized computer system 10 on which the weight depth limited (WDL) concurrency control (CC) according to the invention may be implemented. The computer system 10 supports a plurality of on-line user terminals 12 via a terminal access network 14, which may be either local or remote or a combination of both. The computer system 10 also has attached a plurality of direct access storage devices (DASDs) 16 and 18, which may typically be disk packs. It will be understood, of course, that the attachment of the DASDs 16 and 18 to the computer system 10 is via control devices (not shown) which are commercially available and known in the art.

The computer system 10 supports several processes. The first of these is the communication access method 20 which provides the interface to the terminal access network 14. The communication access method 20, in turn, communicates with transaction queues 22 for various transaction processing regions 24. The transaction manager 26 controls the processing in the various transaction processing regions 24, accessing database disks in DASDs 16 via a buffer manager 27 and maintaining a log of transactions on log disks in DASDs 18 via a log manager 28. Since the system shown in FIG. 1 contemplates multiple users at the terminals 12 having simultaneous access to a common database, the transaction manager 26 must employ a concurrency control 29.

The system shown in FIG. 1 may be implemented with an IBM System/370 computer running the IBM MVS operating system (OS), both of which are well known in the art. Additional information of a general nature may be had by reference to Chapter 21, "MVS", of An Introduction to Operating Systems by Harvey M. Deitel, Addison Wesley (1984). More detailed information on the IBM System/370 may be had by reference to IBM System/370, Principles of Operation, IBM Publication No. GA22-7000-10.

Figure 2:
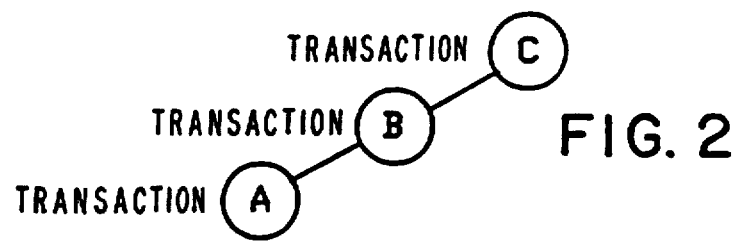
FIG. 2 is graph of conflicted transactions.

The problem addressed by the invention is illustrated in FIG. 2. If a transaction C running on computer system 10 requests a lock held by a transaction B, also running on computer system 10 but which itself is blocked by a third transaction A running on the computer system 10 (due to a different lock conflict than the current one), the transaction manager 26 takes action to resolve the conflict by restarting one of the transactions. An example of how the WDL method according to the invention would operate as follows. First, assume that transaction B is a transaction issuing a lock request, and that this request results in a conflict with transaction A. The WDL method reduces a wait tree to a depth of one by, in this case, restarting either transaction A or transaction B, based on properties of the transactions in the wait tree. This is merely an illustration, and a fully general description is given below.

A class of methods will now be described that limits the depth of all wait trees to a given positive integer value d using transaction specific information represented by a real-valued function L, where for each transaction T in the system at any instant of time $L(T)$ provides some measure of the current "length" of the transaction. Ways of implementing this length function are described in more detail below. For the purpose of this description, let $V_j$ be a wait tree rooted at transaction $T_j$ whose nodes are transactions $\{T_i\}_j$. It could occur that two or more of the transactions $\{T_i\}_j$ are actually the same transaction. This situation can occur because conflicts are treated pair-wise. A consequence is the possibility of deadlock, so that if trees of depth greater than one are permitted, the case of deadlock needs to be considered. However, for WDL(d) with $d=1$, deadlocks are eliminated automatically, since a deadlock implies a wait chain of length at least two. The class of concurrency control methods referred to here as WDL(d) is as follows.

Given a lock conflict associated with a wait tree $V_j$, then a concurrency control method is a member of WDL(d) if it restarts some subset of transactions $\{T_i\}_j$ as a function of the tree structure and the length of each transaction in the tree denoted by $[V_j,\{L(T_i)\}_j]$, so that the depth is reduced or kept to no more than d.

The foregoing description provides full generality. In the preferred embodiment of the invention, a method in WDL(1) is described; that is, a concurrency control method in which all wait trees are limited to a depth of one. Some ways of implementing the length function L are as follows: (1) $L(T)$ is the number of locks currently held by transaction T. (2) $L(T)$ is the maximum of the number of locks held by any incarnation of transaction T, including the current one. (3) $L(T)$ is the sum of the number of locks held by each incarnation of T up to the current one. Other implementations of the length function may also be possible.

Figure 3A:
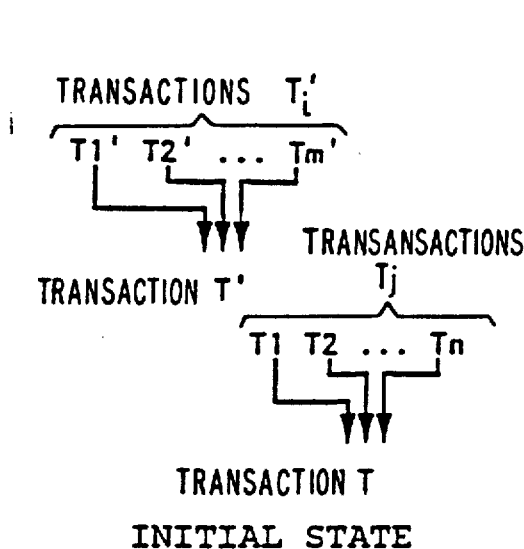
FIGS. 3A to 3D are diagrams illustrating respectively an initial state and three cases of conflicted transactions demonstrating how the concurrency control method according to the invention operates in a centralized environment.
Figure 3B:
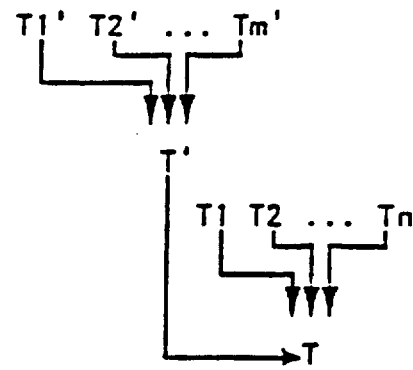
Figure 3C:
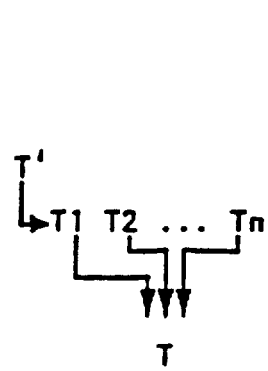
Figure 3D:
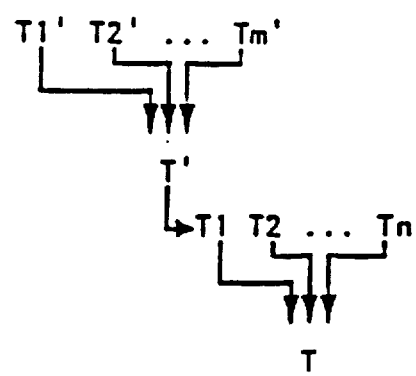
Figure 4:
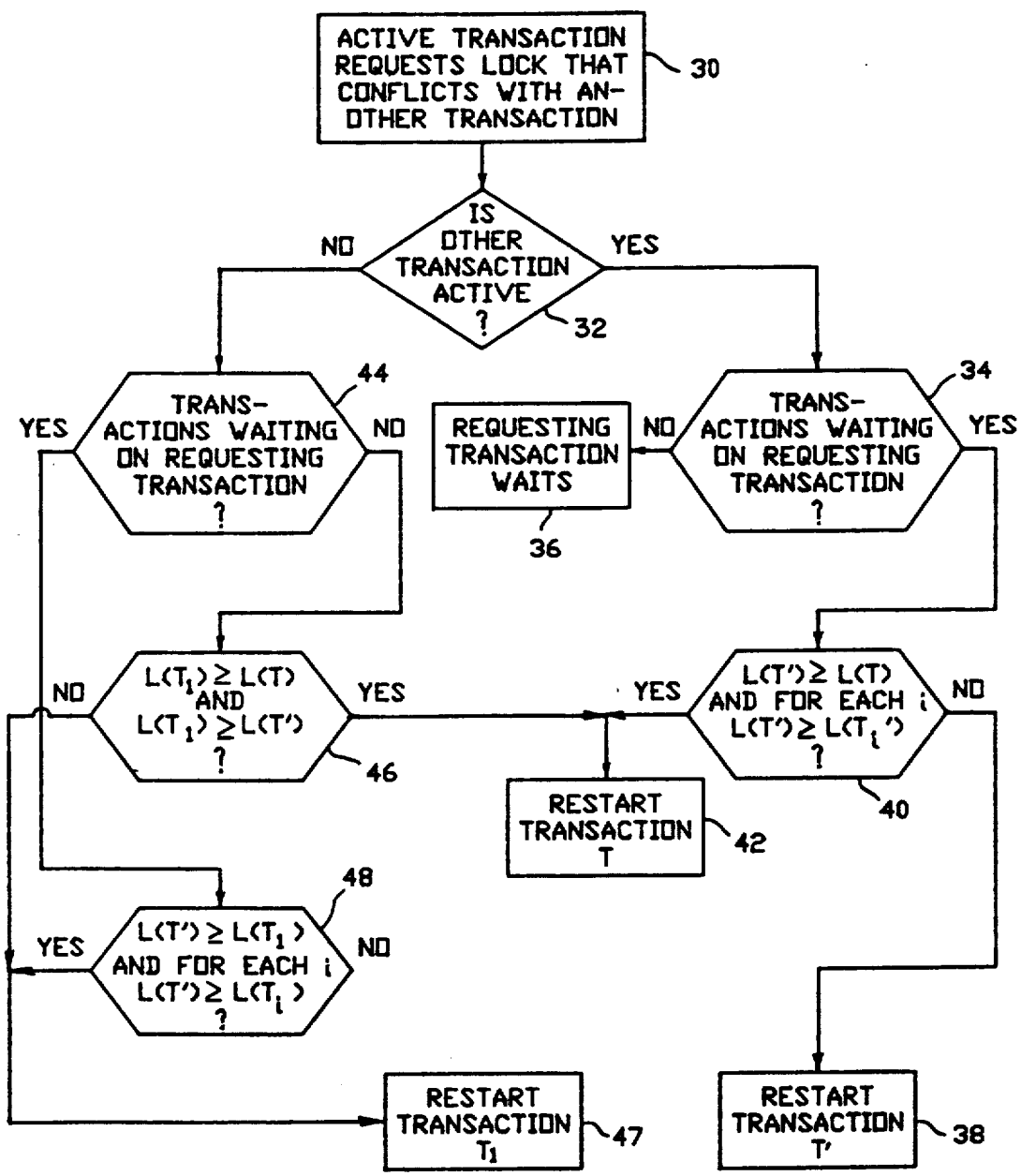
FIG. 4 is a flow diagram illustrating the conflict resolution process for the cases shown in FIGS. 3A to 3D.

Referring now to FIG. 3A, suppose there are two active transactions T' and T with m and n transactions waiting on each, respectively, shown in the figure as the initial state (where m or n could be zero). Since under WDL(1) no wait trees of depth greater than one will be allowed, there cannot be any transactions waiting on any of the transactions $T_i'$ or the transactions $T_j$, and thus this represents the general case for two active transactions. a Suppose that transaction T' makes a lock request that conflicts with transaction T or with one of the transactions $T_j$. Temporary states in which wait trees of depth two or three can occur are shown in FIGS. 3B, 3C and 3D. Note that for the cases shown in FIGS. 3C and 3D, n must be greater than zero in order for these cases to arise. For a preferred embodiment of the invention implemented in a centralized environment as shown in FIG. 1, the method is illustrated in the flow diagram of FIG. 4 follows. The process begins in function block 30 with an active transaction T' requesting a lock that conflicts with another transaction.

In FIG. 3B, Case I is illustrated. A test is first made in decision block 32 to determine if the other transaction is active. Since transaction T is active in Case I, the result of this test is positive. A test is then made in decision block 34 to determine if there are transactions waiting on transaction T'. If $m=0$, the wait tree is of depth one and transaction T' waits, as indicated by function block 36. Otherwise, $m>0$ and the wait tree is of depth two. In order to reduce the depth to one, transaction T' is restarted in function block 38 unless $L(T') \geq L(T)$ and, for each i, $L(T') \geq L(T_i')$, as determined in decision block 40, in which case priority is given to transaction T' and transaction T is restarted instead, as indicated in function block 42.

In FIG. 3C, Case II is illustrated. In this case, the test in decision block 32 is negative, and a test is made in decision block 44 to determine if any transactions are waiting on transaction T'. The result of this test in Case II is negative; i.e., $m=0$, and the wait tree is of depth two. In order to reduce the depth to one, transaction $T_1$ is restarted in function block 49 unless $L(T_1) \geq L(T)$ and $L(T_1) \geq L(T')$, as determined by the test in decision block 46, in which case priority is given to transaction $T_1$, and transaction T is restarted instead, as indicated by function block 45.

In FIG. 3D, Case III is illustrated. In this case, the test in decision block 44 is positive; that is, there are other transactions waiting on the first or requesting transaction. The wait tree is therefore of depth three. In order to reduce the depth to one, transaction T' is restarted in function block 38 unless $L(T') \geq L(T_1)$ and, for each i, $L(T') \geq L(T_i')$, as determined in function block 48, in which case priority is given to transaction T', and transaction $T_1$ is restarted instead, as indicated in function block 45.

Given the foregoing description of a preferred embodiment which is a CC method in WDL(1), it is straightforward to design similar methods in WDL(d) for $d>1$ using the techniques illustrated by the preferred embodiment. As an example of this, a CC method in WLD(2) will now be described; that is, a method in which the wait depth is limited to two.

For this example method in WDL(2), suppose that all current wait trees are of depth two or less, and that a conflict then occurs which results in a temporary wait tree of depth greater than two. Note that this wait tree is temporary since the CC method will restart transactions so as to reduce the depth to two or less. The maximum temporary wait depth is five, which occurs only in the following case: (a) there are initially two wait chains of depth two, say transaction $T_3$ waiting on transaction $T_2$ which is waiting on transaction $T_1$ which is running, and transaction $T_6$ waiting on transaction $T_5$ which is waiting on transaction $T_4$ which is running; (b) transaction $T_4$ issues a request which conflicts with transaction $T_3$, resulting in the wait chain $T_6 \rightarrow T_5 \rightarrow T_4 \rightarrow T_3 \rightarrow T_2 \rightarrow T_1$ (using the notation $A \rightarrow B$ for "A waiting on B"). Following the design technique of restarting at most one transaction to reduce wait depth to the appropriate value, which is a technique used in the preferred embodiment method in WDL(1), there are only two transactions that are candidates for restart in this case, namely transactions $T_3$ or $T_4$. Note that these are the two "middle" transactions in the temporary wait chain. Since before the request of transaction $T_4$ that resulted in the conflict transaction $T_4$ was running and transaction $T_3$ was waiting, another technique illustrated by the preferred embodiment of the invention can be used. That technique is giving priority to a running transaction unless the length of a waiting transaction is sufficiently long. This results in the following rule: In order to reduce all wait depths to two or less, restart transaction $T_3$ (which was already waiting), unless the length of transaction $T_3$ is greater than both the lengths of transactions $T_2$ and $T_4$, in which case, restart transaction $T_4$. The other two cases in which the temporary wait depth is three or four can be handled using similar techniques as previously described.

In the foregoing description, it was assumed that locks are exclusive; that is, a lock can be held or owned by at most a single transaction. This is the most basic type of concurrency control method for transaction processing systems and has the property that the data structure implementing the transaction "waiting-on" relation is a collection of directed multi-way trees. However, it is well-known how to generalize exclusive locks to multi-mode locks, in which a lock can be held by a transaction in one of several modes and the same lock can be held by multiple transactions providing that all of the modes in which each such transaction holds the lock are compatible. Introductory material describing multi-mode locks can be found, for example, in Chapter 11, Section 3, of Korth and Silberschatz, Database System Concepts, supra. As discussed there, multi-mode locks can be defined by a mode compatibility matrix, and the simplest example of multi mode locks are share exclusive locks, in which share mode is compatible with share mode and the other mode combinations (share-exclusive and exclusive-exclusive) are incompatible.

Figure 5A:
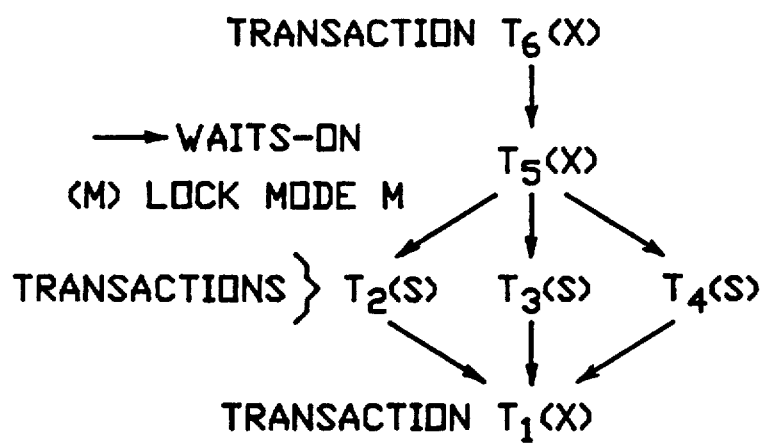
FIGS. 5A and 5B are diagrams illustrating two cases of conflicted transactions demonstrating how the concurrency control method according to the invention operates using multi-mode locks.
Figure 5B:
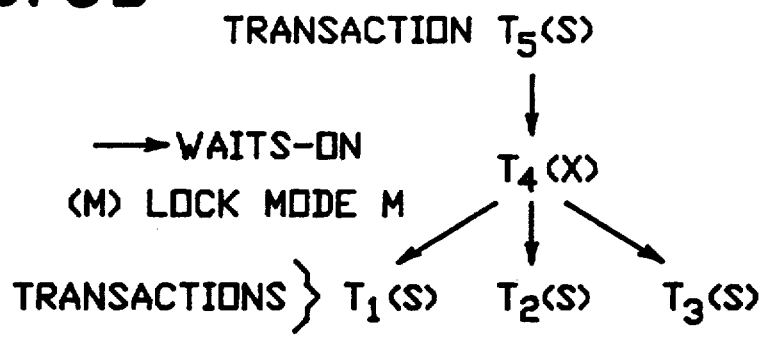

When using multi-mode locks, the transaction waiting-on relations are no longer a collection of directed multi-way trees, but rather is in general a directed graph. Furthermore, the waiting-on relation for a single lock can always be represented by a directed series-parallel graph. This is illustrated by examples in FIGS. 5A and 5B, where for simplicity share-exclusive (S-X) mode locks are shown; however, it should be understood that the same type of graphs handle the general case of multi-mode locks since it is only mode compatibility that determines whether parallel or series waiting occurs, and not the actual modes. FIGS. 5A and 5B are both for the case of a single lock, and when multiple locks are involved, directed series-parallel graphs of the types illustrated are combined to generate more complex directed graphs. As shown in FIG. 5A, a single transaction $T_1$ can hold a lock in exclusive mode, with multiple transactions $T_2$, $T_3$, $T_4$ waiting in parallel for share mode access, and with "series" waiting by $T_5$ and $T_6$ for exclusive access. As shown in FIG. 5B, a lock can be held by multiple transactions $T_1$, $T_2$, $T_3$ in share mode, and with series waiting by $T_4$ and $T_5$ for exclusive and share access, respectively. Note that in FIG. 5B transaction $T_5$ is made to wait even though it has requested the lock in a mode that is compatible with the modes the lock is currently held in due to an earlier incompatible request by $T_4$. This is the technique usually followed in practice in order to prevent "starvation"; i.e., indefinite delay of a request.

Although the transaction waiting-on relations are directed graphs rather than trees in the case of multi-mode locks, the WDL methods for concurrency control previously described for the case of exclusive locks and wait trees can be used in this more general case by grouping together related transactions. This takes place as follows. Given any directed transaction wait graph, group together every collection of two or more transactions holding or waiting in parallel for a lock in compatible modes into a single "super-transaction". After all such collections of transactions have been grouped together, the result is a directed wait graph with nodes that are either single transactions or such super-transactions. Given such a wait graph, the WDL methods previously described can now be applied, where it is understood that restarting a super-transaction means restarting every transaction in the group making up the super-transaction, providing the length of a super-transaction can be determined. Given means for determining the length of a single transaction, examples of which have previously been given, examples of means for determining the length of a super-transaction are (1) the length is the sum of the lengths of each single transaction in the group, (2) the length is the maximum of the lengths of each single transaction in the group, or (3) the length is the total number of distinct locks held by all transactions in the group. Note that if the length of a single transaction is determined by the number of locks held by that transaction (this was the earlier example), example (3) of the length of the super-transaction is not the same as example (1) since multi-mode locks are in use and a single lock may be held by multiple transactions. Finally, other means for determining the length of a super-transaction (such as weighted sum of single transaction lengths, where the weight could be, for example, determined by whether a transaction is running or waiting) are possible and can be easily devised given the foregoing description.

The weight depth limited (WDL) concurrency control (CC) method according to the invention is not limited to centralized environment as generally shown in FIG. 1. It may be applied to distributed environment of the type shown in FIG. 6. Here, a plurality of computer systems $10_1$, $10_2$ and $10_3$, each similar to computer system 10 in FIG. 1, are connected to global network 50.

The WDL CC described above works well for centralized systems. However, extending WDL to distributed transaction processing in an efficient way is a nontrivial problem since centralized WDL makes use of global information on the number of locks held by each transaction and the wait relations among all transactions. According to the present invention, the WDL CC is applied to a distributed transaction processing system by adopting a different length function.

As in the usual locking-based approach to distributed concurrency control, described in Korth and Silberschatz referred to above, it is assumed (1) that lock tables are maintained at each node by means of local concurrency control at that node, (2) that subtransactions acquire locks on data items as they are accessed in the appropriate lock modes, (3) that one subtransaction accessing a data item held in an incompatible mode by another subtransaction is made to wait on the conflicting subtransaction (with the wait relations maintained locally) until the conflicting subtransaction commits or aborts (and the waiting subtransaction may be restarted before then), and finally (4) that the locks required for recovery purposes held by a subtransaction are not released until the global transaction is either committed or aborted.

Figure 6:
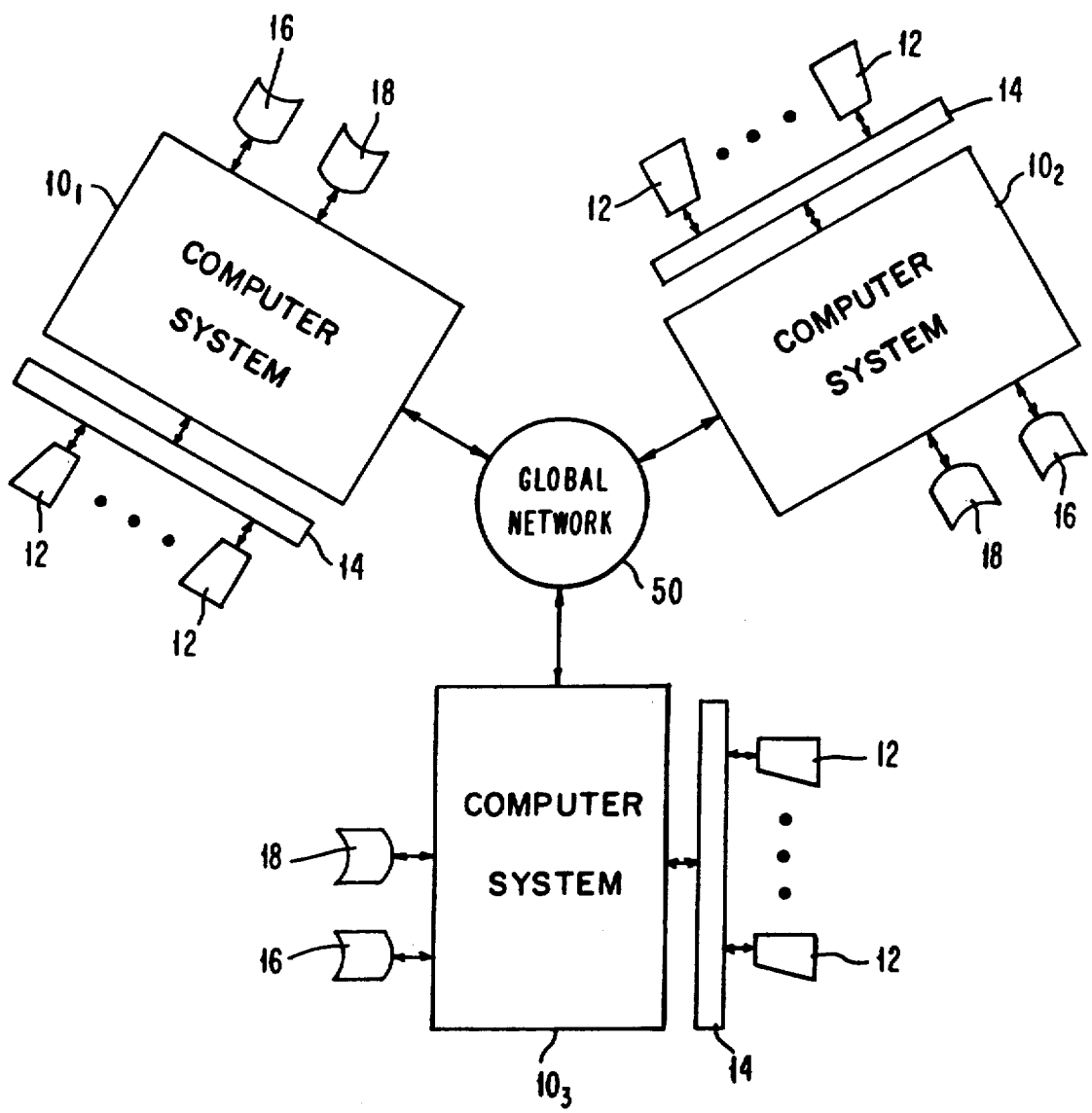
FIG. 6 is a block diagram of a typical distributed computer system on which another embodiment of the invention may be implemented.

In the general formulation of WDL, a length function is used in conjunction with wait relations in order to make restart decisions. In the centralized case it is convenient to define the length of a transaction T as the number of locks held by T, and this has been shown to yield good performance. However, in a distributed environment as shown in FIG. 6, given a particular subtransaction, determination of the total number of locks held by all subtransactions of the global transaction would involve excessive communication, and in any case the information could be obsolete by the time it was finally collected. Therefore, for distributed WDL, a length function based on time is used, as follows. Each global transaction is assigned a starting time, and this starting time is included int he startup message for each subtransaction, so that the starting time of the global transaction will be locally known at any node executing one of its subtransactions. Given a transaction, its length is defined as (current time)−(starting time of global transaction). It is expected that the length defined in this fashion will be highly correlated with the total number of locks held by all subtransactions of a global transactions and, therefore, will have similar performance characteristics when used as a WDL length function. Although distributed clock synchronization has been widely studied, extremely accurate clock synchronization is not required for the purposes of the invention as applied to the distributed systems since typical time-of-day clocks correctly set to an external standard reference time will suffice.

The following notation and conventions are used in the description which follows:
1. At any point in time there is a set of global transactions $\{T_i\}$.
2. Each transaction $T_i$ has an originating or primary node, denoted by $P(T_i)$, with starting time denoted by $t(T_i)$.
3. If $T_i$ has a subtransaction at node k, this subtransaction is denoted by $T_{ik}$.
4. There are two concurrency control subsystems at each node k, the LCC (local concurrency control) which manages locks and wait relations for all subtransactions $T_{ik}$ executing at node k, and the GCC (global concurrency control) which manages all wait relations that include any transactions $T_i$ with $P(T_i)=k$ and makes global restart decisions for any of the transactions in this set of wait relations.
5. There is a send function that transparently sends messages between subsystems whether they are at the same or different nodes.

The general idea of the invention as applied to distributed transaction processing systems is that (1) whenever a LCC schedules a wait between two subtransactions, this information is sent via messages to the GCCs of the primary nodes of the corresponding global transactions, and (2) each GCC will asynchronously determine if transactions should be restarted using its waiting and starting time information. Due to LCCs and GCCs operating asynchronously, conditions may temporarily arise in which the wait depth of subtransactions is greater than one; however, such conditions will eventually be resolved either by a transaction committing or by being restarted by a GCC. The operation of the invention as applied to a distributed system will now be described in more detail.

In addition to the usual functions of granting lock requests, scheduling subtransaction waits, and releasing locks as part of subtransaction commit or abort processing, each LCC does the following. Whenever a wait $T_{ik} \rightarrow T_{jk}$ is scheduled, the message $(T_i \rightarrow T_j, P(T_j), t(T_j))$ is sent to the GCC at node $P(T_i)$ and the message $(P(T_i), t(T_i), T_i \rightarrow T_j)$ is sent to the GCC at node $P(T_j)$, unless $P(T_i) = P(T_j)$ in which case only one message $(T_i \rightarrow T_j)$ is sent to the GCC at node $P(T_i)(=P(T_j))$.

Each GCC dynamically maintains a wait graph of global transactions which is updated using the messages it receives from LCCs of the form just described. Note that starting time and primary node information is included in these messages for those transactions that have a primary node different than that of the node to which the message was sent, so that each GCC has starting time and primary node information available for all transactions in its wait tree. Each GCC analyzes this wait information, either periodically or every time a message is received, and determines whether transactions should be restarted using the WDL method, as in the centralized case described above, but using a length function based on starting times. Depending upon timing details, wait graphs may occur in which the wait depth is greater than one; however, this situation is covered in the general formulation of the WDL CC method. Whenever it is decided that a transaction $T_i$ should be restarted, a restart message for transaction $T_i$ is sent to node $P(T_i)$. However, no wait relations are modified by the GCC at this time, since transaction $T_i$ could currently be in a commit or abort phase. Instead, the status of transaction $T_i$ is marked as pending.

Actual commit or abort, followed by restart, of a transaction $T_i$ is handled by the transaction coordinator at node $P(T_i)$. Commit is initiated upon receiving successful completion messages from all subtransactions. Abort is initiated upon receiving a restart message from some GCC (or possibly due to receiving an abort message from some other transaction coordinator at a subtransaction node due, for example, to a disk error). The commit or abort is handled by communicating with the transaction coordinators and LCCs at each subtransaction node using known techniques. Additionally, it is necessary to send the appropriate information to each GCC that is currently maintaining wait information for transaction $T_i$. This can be determined locally using the wait information maintained by the GCC at node $P(T_i)$. Specifically, the GCCs for the primary nodes of the transactions that are waiting on transaction $T_i$ or on which transaction $T_i$ is waiting must be notified. Each such GCC removes transaction $T_i$ from its wait tree and acknowledges. In the case of a transaction restart, restart can be initiated after receiving acknowledgment from all subtransaction nodes and each such GCC.

Figure 7:
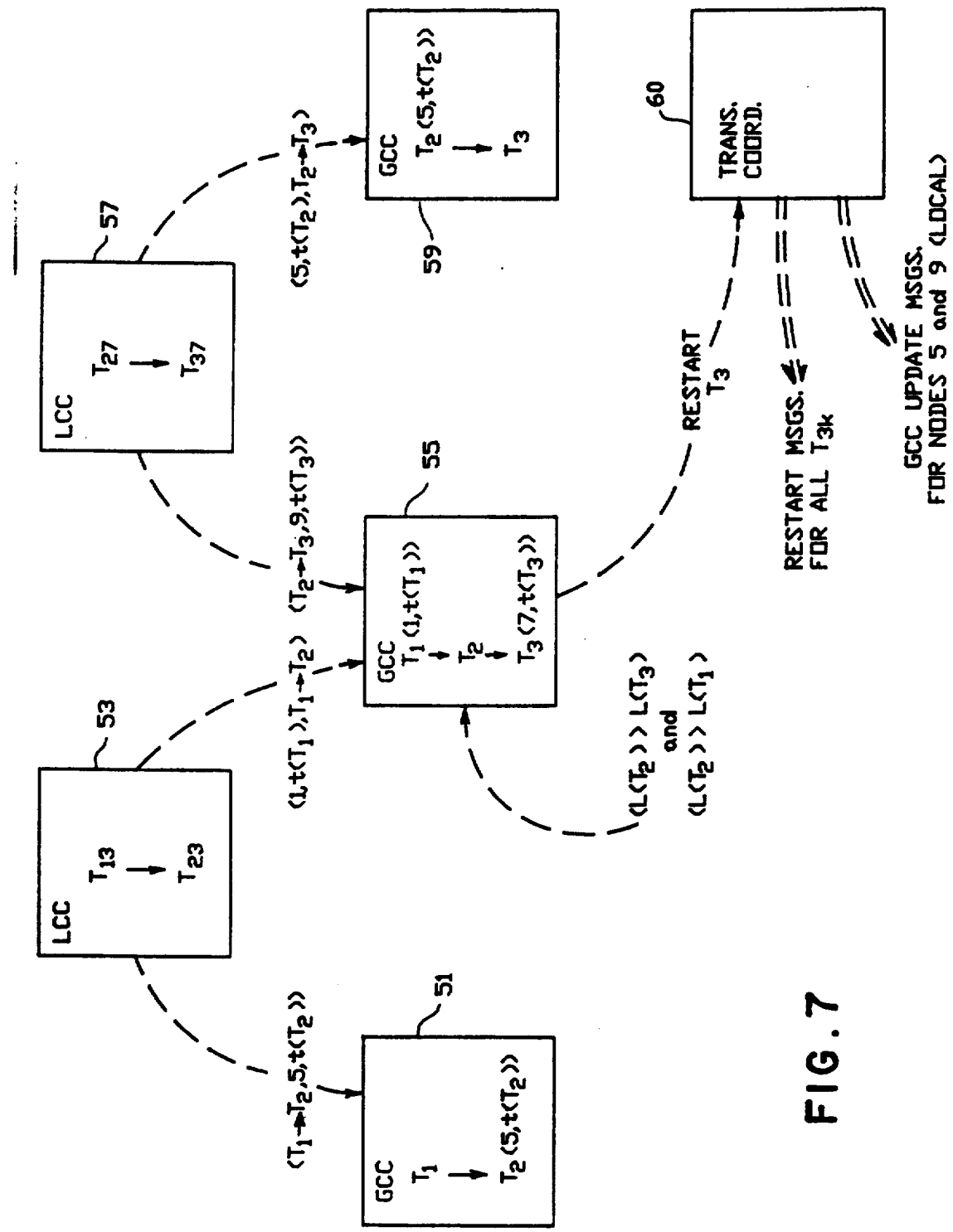
FIG. 7 is a block diagram illustrating the application of the invention to a distributed transaction database processing system.

The invention as applied to a distributed transaction processing system is illustrated by a simple example shown in FIG. 7. This simple distributed system comprises five nodes 51, 53, 55, 57, and 59. Each node has an LCC and a GCC as well as a local transaction coordinator. In the example shown, only the coordinator 60 for node 59 is shown. To illustrate the operation, there are three transactions $T_1$, $T_2$ and $T_3$ at primary nodes 51, 55 and 59 with various subtransactions scattered around the system. Only those subtransactions that enter a wait relation are indicated in FIG. 7. At node 53, subtransaction $T_{13}$ requests a lock held in an incompatible mode by subtransaction $T_{23}$. The LCC at node 53 schedules ($T_{13} \rightarrow T_{23}$), and messages are sent as shown to the GCCs at nodes 51 and 55 (i.e., $P(T_1)$ and $P(T_2)$, respectively). Concurrently, at node 57, subtransaction $T_{27}$ requests a lock held in an incompatible mode by subtransaction $T_{37}$, the LCC at node 57 schedules ($T_{27} \rightarrow T_{37}$), and messages are sent as shown to the GCCs at nodes 55 and 59 (i.e., $P(T_2)$ and $P(T_3)$, respectively). At some later time, these various messages are received and wait graphs are updated by the GCCs at nodes 51, 55 and 59. After both messages for the GCC at node 55 are received, there is a wait chain of depth two, as shown in FIG. 7. The GCC at node 55 determines, using local current time and the recorded starting time for each transaction that $L(T_2) > L(T_3)$ and $L(T_2) > L(T_1)$. Therefore, following the WDL CC method, it decides to restart transaction $T_3$ and sends a restart message to the transaction coordinator 60 at node 59 (i.e., $P(T_3)$). The transaction coordinator 60 at node 59 receives the restart message and begins transaction restart by sending restart messages for all nodes executing a subtransaction $T_{3k}$ and GCC update messages to the local GCC and the GCC at node 55.

Note that in practice, situations could develop that would be far more complex than that of the simple example shown in FIG. 7. Due to the fact that GCCs operate independently and asynchronously, decisions could be made concurrently by two or more GCCs to restart different transactions in the same wait chain, a situation that would not occur in the centralized case. However, experience and the results of various studies suggest that CC performance is dominated by the way in which simple cases are handled. Thus, the distributed WDL method according to the invention is expected to have performance characteristics similar to those of the centralized WDL method.

Figure 8:
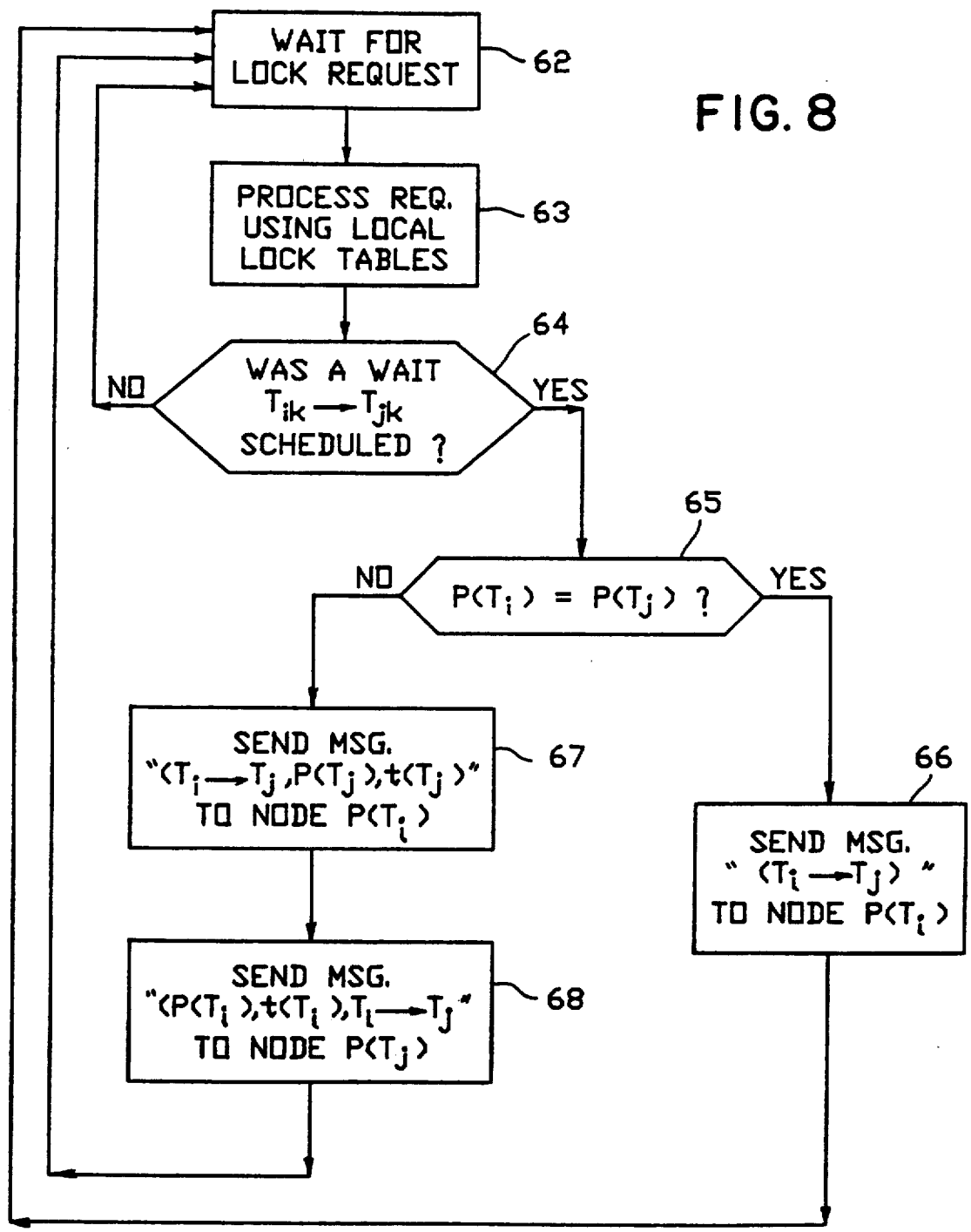
FIG. 8 is a flow diagram of the logic of the local concurrency control in the distributed system.
Figure 9:
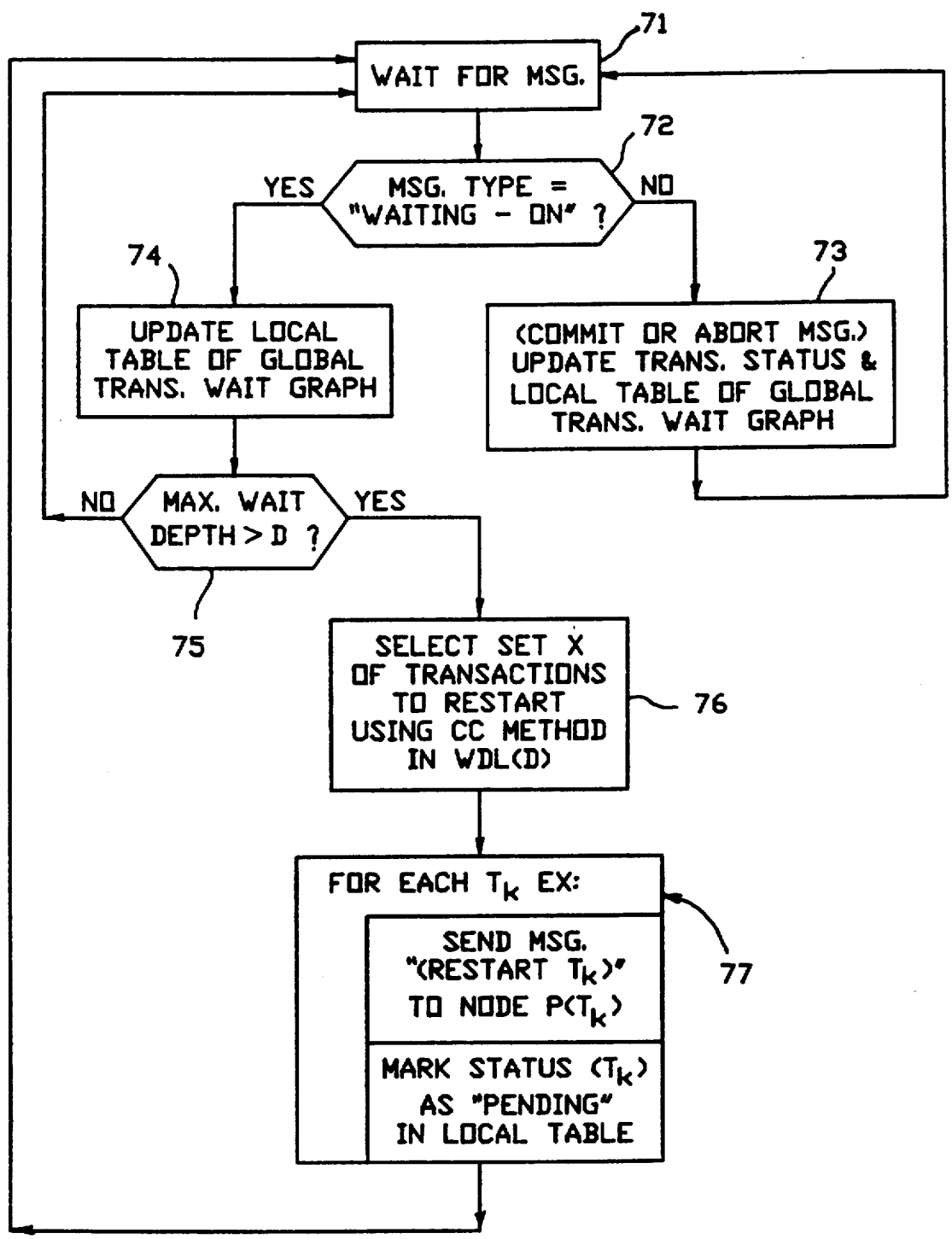
FIG. 9 is a flow diagram of the logic of the global concurrency control in the distributed system.

For a preferred embodiment of the invention implemented in a distributed environment as shown in FIG. 6, the method is illustrated in the flow diagrams of FIGS. 8 and 9. More specifically, FIG. 8 shows the flow diagram of the logic of the local concurrency control, and FIG. 9 is a flow diagram of the logic of the global concurrency control in the distributed system.

Reference is first made to FIG. 8 where the process for the local concurrency control begins in function block 62 waiting for a lock request. When a lock request is received, it is processed using local lock tables, as indicated by function block 63 and then, in decision block 64, a test is made to determine if a wait $T_{ik} \rightarrow T_{jk}$ is scheduled. This is determined by examining the wait graphs stored at the node. If no such wait is scheduled, the processing for the lock request is complete using the local lock tables, and the process returns to function block 62 to await the next lock request.

If, however, a wait $T_{ik} \rightarrow T_{jk}$ is scheduled, a further test is made in decision block 65 to determine if the nodes $P(T_i)$ and $P(T_j)$ are the same. If so, a message that transaction $T_i$ is waiting on transaction $T_j$ is sent to the global concurrency control (GCC) at node $P(T_i)$ in function block 66, and the process loops back to function block 62 to await the next lock request. On the other hand, if the nodes $P(T_i)$ and $P(T_j)$ are not the same, the message "$(T_i \rightarrow T_j, P(T_j), t(T_j))$" is sent to the GCC at node $P(T_i)$ in function block 67, and the message "$(P(T_i), t(T_i), T_i \rightarrow T_j)$" is sent to the GCC at node $P(T_j)$ in function block 68 before the process loops back to function block 62.

Turning now to FIG. 9, the process for the GCC begins at function block 71 by waiting for a message as might be sent by function blocks 66, 67 or 68 of the LCC in FIG. 8. When a message is received, a test is made in decision block 72 to determine if the message type is a "waiting-on" type of message. If not, the transaction either committed or aborted in function block 73 before a return is made to function block 71 to await another message. A transaction is committed by updating a transaction status and the local table of the global transaction wait graph.

If the message is a "waiting-on" type message, the local table of the global transaction wait graph is updated in function block 74, and then a test is made in decision block 75 to determine if the maximum wait depth has been exceeded. If not, a return is made to function block 71, but if the wait depth has been exceeded, a set of X transactions are selected in function block 76 for restart. Then transaction $T_k$ in the set X ($T_k \in X$), (1) a message is sent to node $P(T_k)$ to restart transaction $T_k$ and (2) the status of transaction $T_k$ is marked as "pending" in the local table, all as indicated by function block 77. A return is then made to function block 71 to await the next message.

While the invention has been described in terms of preferred embodiments for central and distributed data processing environments using both single and multimode locks, those skilled in the art will recognize that the invention can be practiced with modification within the spirit and scope of the appended claims.

Having thus described our invention, what we claim as new and desire to secure by Letters Patent is as follows:

1. In a multi-user data processing system having a transaction manager including lock tables for managing accesses to a database by a plurality of concurrently running transactions, a waiting depth limited concurrency control method performed by said transaction manager and comprising the steps of:

maintaining a wait depth data structure which graphically describes a waiting depth of transactions being processed by said system where, for each transaction in the system at any instant of time, a real-valued function provides a measure of a current length of a transaction, wherein said data processing system is a centralized system and locks granted by said transaction manager are shared or exclusive, said data structure being a directed graph describing a hierarchy of transactions waiting on other transactions for release of exclusive locks on portions of said database, and said real-valued function is a number of locks held by a transaction;

for each request for a lock by a transaction, testing the wait depth data structure to determine if said waiting depth exceeds a predetermined value;

using said real-valued function to determine which subset of transactions is to be restarted in case of a conflict between transactions which results in said waiting depth exceeding said predetermined value; and restarting said subset of transactions so that the wait depth is reduced or kept to no more than said predetermined value.

2. The waiting depth limited concurrency control method recited in claim 1 further comprising the step of revising said directed graph by grouping together every collection of two or more transactions holding or waiting in parallel for a lock in compatible modes into a single "super-transaction" so that every node in said directed graph is either a single transaction or a super-transaction.

3. The waiting depth limited concurrency control method as recited in claim 1 wherein each transaction running on the system is time stamped with a starting time and said real-valued function is a length of time a transaction has been running computed from said starting time to a current time.

4. In a multi-user data processing system having a transaction manager including lock tables for managing accesses to a database by a plurality of concurrently running transactions, a waiting depth limited concurrency control method performed by said transaction manager and comprising the steps of:

maintaining a wait depth data structure which graphically describes a waiting depth of transactions being processed by said system where, for each transaction in the system at any instant of time, a real-valued function provides a measure of a current length of a transaction, wherein there are at least two active transactions T' and T running on the data processing system with m and n transactions waiting on each, respectively, and m is greater than zero, and transaction T' makes a lock request that conflicts with transaction T, and wherein said real-valued function is L and L(T) is a measure of a length of a transaction T;

for each request for a lock by a transaction, testing the wait depth data structure to determine if said waiting depth exceeds a predetermined value;

using said real-valued function to determine which subset of transactions is to be restarted in case of a conflict between transactions which results in said waiting depth exceeding said predetermined value; and restarting said subset of transactions so that the wait depth is reduced or kept to no more than said predetermined value by testing to determine if $L(T') \geq L(T)$ and if, for each i, $L(T') \geq L(Ti')$, and if so, giving priority to transaction T' and restarting transaction T; otherwise, restarting transaction T'.

5. In a multi-user data processing system having a transaction manager including lock tables for managing accesses to a database by plurality of concurrently running transactions, a wait depth limited concurrency control method comprising the steps of:

maintaining a wait depth data structure which graphically describes a waiting depth of transactions being processed by said system where, for each transaction in the system at any instant of time, a real-valued function provides a measure of a current length of a transaction, wherein there are at least two active transactions T' and T running on the data processing system with m and n transactions waiting on each, respectively, and m is equal to zero, and transaction T' makes a lock request that conflicts with a transaction $T_1$ waiting on transaction T, and wherein said real-valued function is L and L(T) is a measure of a length of a transaction T;

for each request for a lock by a transaction, testing the wait depth data structure to determine if said waiting depth exceeds a predetermined value;

using said real-valued function to determine which subset of transactions is to be restarted in case of a conflict between transactions which results in said waiting depth exceeding said predetermined value; and restarting said subset of transactions so that the wait depth is reduced or kept to no more than said predetermined value by testing to determine if $L(T_1) \geq L(T)$ and $L(T_1) \geq L(T')$, and if so, restarting transaction T; otherwise, restarting transaction $T_1$.

6. In a multi-user data processing system having a transaction manager including lock tables for managing accesses to a database by a plurality of concurrently running transactions, a wait depth limited concurrency control method comprising the steps of:

maintaining a wait depth data structure which graphically describes a waiting depth of transactions being processed by said system where, for each transaction in the system at any instant of time, a real-valued function provides a measure of a current length of a transaction, wherein there are at least two active transactions T' and T running on the data processing system with m and n transactions waiting on each, respectively, and m is greater than zero, and transaction T' makes a lock request that conflicts with a transaction $T_1$ waiting on transaction T, and wherein said real-valued function is L and L(T) is a measure of a length of a transaction T;

for each request for a lock by a transaction, testing the wait depth data structure to determine if said waiting depth exceeds a predetermined value;

using said real-valued function to determine which subset of transactions is to be restarted in case of a conflict between transactions which results in said waiting depth exceeding said predetermined value; and restarting said subset of transactions so that the wait depth is reduced or kept to no more than said predetermined value by testing to determine if $L(T_1) \geq L(T_1)$ and, for each i, if $L(T') \geq L(T_i')$, and if so, giving priority to transaction T' and restarting transaction $T_1$; otherwise restarting transaction T'.

7. In a multi-user data processing system having a transaction manager including lock tables for managing accesses to a database by a plurality of concurrently running transactions, a waiting depth limited concurrency control method comprising the steps of:

maintaining a wait depth data structure which graphically describes a waiting depth of transactions being processed by said system where, for each transaction in the system at any instant of time, a real-valued function provides a measure of a current length of a transaction, wherein there are at least two active transactions T' and T running on the data processing system with m and n transactions waiting on each, respectively, and m is greater than zero, and transaction T' makes a lock request that conflicts with a transaction T, and wherein said real-valued function is L and L(T) is a measure of a length of a transaction T;

for each request for a lock by a transaction, testing the wait depth data structure to determine if said waiting depth exceeds a predetermined value;

using said real-valued function to determine which subset of transactions is to be restarted in case of a conflict between transactions which results in said waiting depth exceeding said predetermined value; and restarting said subset of transactions so that the wait depth is reduced or kept to no more than said predetermined value by testing to determine if $L(T') \geq L(T)$ and, for each i, if $L(T') \geq L(T_i')$, and if so, giving priority to transaction T' and restarting transaction T; otherwise restarting transaction T';

but if m is equal to zero, and transaction T' makes a lock request that conflicts with a transaction $T_1$ waiting on transaction T, then testing to determine if $L(T_1) \geq L(T)$ and $L(T_1) \geq L(T')$, and if so, restarting transaction T; otherwise, restarting transaction $T_1$;

but if m is greater than zero, and transaction T' makes a lock request that conflicts with a transaction $T_1$ waiting on transaction T, then testing to determine if $L(T') \geq L(T)$ and, for each i, if $L(T') \geq L(T_i')$, and if so, giving priority to transaction T' and restarting transaction T; otherwise restarting transaction T'.

8. In a multi-user data processing system having a transaction manager including lock tables for managing accesses to a database by a plurality of concurrently running transactions, a waiting depth limited concurrency control method performed by said transaction manager and comprising the steps of:

maintaining a wait depth data structure which graphically describes a waiting depth of transactions being processed by said system where, for each transaction in the system at any instant of time, a real-valued function provides a measure of a current length of a transaction, wherein said data processing system is a distributed system having a plurality of nodes, each of said nodes having a transaction manager including a local concurrency control and a global concurrency control and each transaction executes as a number of communicating subtransactions running concurrently at different ones of said nodes, said local concurrency controls managing locks and wait relations for subtransactions executing at their respective nodes and said global concurrency controls managing all wait relations that include any transaction with their respective node;

for each request for a lock by a transaction, testing the wait depth data structure to determine if said waiting depth exceeds a predetermined value;

using said real-valued function to determine which subset of transactions is to be restarted in case of a conflict between transactions which results in said waiting depth exceeding said predetermined value; and restarting said subset of transactions so that the wait depth is reduced or kept to no more than said predetermined value, said global concurrency control making global restart decisions for any of the transactions in their set of wait relations.

9. The waiting depth limited concurrency control method as recited in claim 8 wherein said local concurrency control performs the steps of:

processing each lock request using local lock tables and then determining if a first transaction is scheduled to wait on a second transaction;

for each first transaction scheduled to wait on a second transaction as a result of processing a lock request, determining if said first and second transaction are running on a same node in said system; and for those first transactions scheduled to wait on a second transaction at the same node, sending the global concurrency control at said node a message that said first transaction is waiting on said second transaction.

10. The waiting depth limited concurrency control method as recited in claim 9 wherein said first and second transactions are not at the same node in the system, said local concurrency control further performs the steps of:

sending a message to the global concurrency control of a node on which said first transaction is running that said first transaction is waiting on said second transaction; and sending a message to the global concurrency control of a node on which said second transaction is running that said first transaction is waiting on said second transaction.

11. The waiting depth limited concurrency control method as recited in claim 10 wherein said global concurrency control performs the step of upon receiving a message that a first transaction is waiting on a second transaction, updating a local table of a global wait directed graph to reflect the message, said global concurrency control then determining whether to restart transactions to maintain said wait depth to no more than said predetermined value.

12. The waiting depth limited concurrency control method as recited in claim 11 wherein each transaction running on the system is time stamped with a starting time and said real-valued function is a length of time a transaction has been running computed from said starting time to a current time.

13. The wait depth limited concurrency control method recited in claim 8 wherein said data structure is a directed graph describing a hierarchy of transactions waiting on other transactions for release of exclusive locks on portions of said database, and said real-valued function is a number of locks held by a transaction.

14. The wait depth limited concurrency control method recited in claim 13 further comprising the step of revising said directed graph by grouping together every collection of two or more transactions holding or waiting in parallel for a lock in compatible modes into a single "super-transaction" so that every node in said directed graph is either a single transaction or a super-transaction.

15. The waiting depth limited concurrency control method as recited in claim 8 wherein each transaction running on the system is time stamped with a starting time and said real-valued function is a length of time a transaction has been running computed from said starting time to a current time.

16. A multi-user data processing system having a transaction manager including lock tables for managing accesses to a database by a plurality of concurrently running transactions, wherein said data processing system is a centralized system and locks granted by said transaction manager are shared or exclusive, said transaction manager implementing a waiting depth limited concurrency control and comprising:

means for maintaining a wait depth data structure which graphically describes a waiting depth of transactions being processed by said system where, for each transaction in the system at any instant of time, a real-valued function provides a measure of a current length of a transaction;

means for testing the wait depth data structure to determine if said waiting depth exceeds a predetermined value for each request for a lock by a transaction;

means for determining which subset of transactions is to be restarted in case of a conflict between transactions which results in said waiting depth exceeding said predetermined value using said real-valued function, said data structure being a directed graph describing a hierarchy of transactions waiting on other transactions for release of exclusive locks on portions of said database, and said real-valued function is a number of locks held by a transaction; and means for restarting said subset of transactions so that the depth is reduced or kept to no more than said predetermined value.

17. The waiting depth limited concurrency control method recited in claim 16 further comprising the step of revising said directed graph by grouping together every collection of two or more transactions holding or waiting in parallel for a lock in compatible modes into a single "super-transaction" so that every node in said directed graph is either a single transaction or a super-transaction.

18. The waiting depth limited concurrency control method as recited in claim 16 wherein each transaction running on the system is time stamped with a starting time and said real-valued function is a length of time a transaction has been running computed from said starting time to a current time.

19. A multi-user data processing system having a transaction manager including lock tables for managing accesses to a database by a plurality of concurrently running transactions, wherein said data processing system is a distributed system having a plurality of nodes, each of said nodes having a transaction manager including a local concurrency control and a global concurrency control and each transaction executes as a number of communicating subtransactions running concurrently at different ones of said nodes, said transaction manager implementing a waiting depth limited concurrency control and comprising:

means for maintaining a wait depth data structure which graphically describes a waiting depth of transactions being processed by said system where, for each transaction in the system at any instant of time, a real-valued function provides a measure of a current length of a transaction;

means for testing the wait depth data structure to determine if said waiting depth exceeds a predetermined value for each request for a lock by a transaction;

means for determining which subset of transactions is to be restarted in case of a conflict between transactions which results in said waiting depth exceeding said predetermined value using said real-valued function, said local concurrency controls managing locks and wait relations for subtransactions executing at their respective nodes and said global concurrency controls managing all wait relations that include any transaction with their respective node; and means for restarting said subset of transactions so that the depth is reduced or kept to no more than said predetermined value, said global concurrency control making global restart decisions for any of the transactions in their set of wait relations.

20. The wait depth limited concurrency control method recited in claim 19 wherein said data structure is a directed graph describing a hierarchy of transactions waiting on other transactions for release of exclusive locks on portions of said database, and said real-valued function is a number of locks held by a transaction.

21. The waiting depth limited concurrency control method recited in claim 20 further comprising the step of revising said directed graph by grouping together every collection of two or more transactions holding or waiting in parallel for a lock in compatible modes into a single "super-transaction" so that every node in said directed graph is either a single transaction or a super-transaction.

22. The waiting depth limited concurrency control method as recited in claim 19 wherein each transaction running on the system is time stamped with a starting time and said real-valued function is a length of time a transaction has been running computed from said starting time to a current time.

* * * * *